United States Patent
Kumagai (10) Patent No.: US 7,393,007 B2
(45) Date of Patent: *Jul. 1, 2008

(54) AIRBAG DEVICE

(75) Inventor: Masayoshi Kumagai, Shiga (JP)

(73) Assignee: Takata Corporation (JP)

( * ) Notice: Subject to any disclaimer, the term of this patent is extended or adjusted under 35 U.S.C. 154(b) by 278 days.

This patent is subject to a terminal disclaimer.

(21) Appl. No.: 11/022,403

(22) Filed: Dec. 22, 2004

(65) Prior Publication Data

US 2005/0146120 A1 Jul. 7, 2005

(30) Foreign Application Priority Data

Dec. 22, 2003 (JP) ............... 2003-425168

(51) Int. Cl.
*B60R 21/16* (2006.01)
(52) U.S. Cl. ..................................... 280/732
(58) Field of Classification Search ............. 280/731, 280/735, 732
See application file for complete search history.

(56) References Cited

U.S. PATENT DOCUMENTS

| 6,241,279 B1 * | 6/2001 | Ochiai .................. 280/735 |
| 6,353,394 B1 | 3/2002 | Maeda et al. |
| 6,373,146 B2 | 4/2002 | Horikoshi et al. |
| 6,452,288 B1 | 9/2002 | Roth et al. |
| 6,490,515 B1 | 12/2002 | Okamura et al. |
| 6,548,804 B1 | 4/2003 | Yuhara et al. |
| 2005/0151353 A1 * | 7/2005 | Kumagai .............. 280/731 |

FOREIGN PATENT DOCUMENTS

| GB | 2303479 A | 2/1997 |
| JP | 2000-016233 | 1/2000 |
| JP | 2000-355264 | 12/2000 |
| JP | 2001-030869 | 2/2001 |
| JP | 2001-074541 | 3/2001 |
| JP | 2001-074575 | 3/2001 |

* cited by examiner

*Primary Examiner*—Faye M. Fleming
(74) *Attorney, Agent, or Firm*—Fitch, Even, Tabin & Flannery (57) ABSTRACT

An airbag device is provided to reduce the deployment force of an airbag when a vehicle occupant or a child seat is positioned adjacent to an airbag device or a vehicle-body component adjacent to the airbag device. In one form, a passenger-seat airbag device is set in an instrument panel and includes a bracket which is fixed to a vehicle-body member with, for example, a bolt. A strain gauge is attached to the bracket. If a vehicle occupant or a child seat is positioned adjacent to the airbag device, and when an airbag in the process of inflation comes into contact with, for example, a vehicle occupant, the opposing force is transmitted to the bracket via a retainer, such that a strain which is different from that of the normal deployment process is generated in the bracket and detected by the strain gauge for reducing airbag deployment force.

15 Claims, 5 Drawing Sheets

FIG. 6

AIRBAG DEVICE

TECHNICAL FIELD

The present invention relates to airbag devices for protecting occupants in vehicles, and particularly, to an airbag device which detects the deployment state of an airbag in order to control the operation of a gas generator.

BACKGROUND OF THE INVENTION

When a vehicle provided with an airbag device is involved in a collision, an airbag is inflated to restrain a vehicle occupant.

Japanese Unexamined Patent Application Publication No. 9-30367 discloses an airbag device which is capable of controlling the inflation of an airbag when a vehicle occupant or a child seat, for example, is positioned adjacent to the airbag device. According to such an airbag device, two inflators are provided for inflating the airbag. The first inflator is activated to inflate the airbag, and a pressure sensor detects the gas pressure in the airbag. If the gas pressure changes gradually in a predetermined manner, the second inflator is subsequently activated. In contrast, if the gradual change in the gas pressure is higher than usual, the second inflator is prevented from operating.

According to the airbag device in Japanese Unexamined Patent Application Publication No. 9-30367, the gradual change of the gas pressure in the airbag being inflated is determined by monitoring, but it is extremely difficult to perform such determination without allowing errors.

SUMMARY OF THE INVENTION

Accordingly, the object of the present invention is to provide an airbag device which is capable of properly controlling the inflation of an airbag when a vehicle occupant or a child seat, for example, is positioned adjacent to the airbag device.

An airbag device according to the present invention includes an airbag; a gas generator for inflating the airbag; and a control means for determining a deployment state of the airbag to control the inflation of the airbag. The control means includes a detector for detecting a load applied to the airbag device or a vehicle-body component adjacent to the airbag device via the airbag in order to determine the deployment state of the airbag.

Furthermore, according to the airbag device of the present invention, the detector means may comprise a strain gauge.

Furthermore, according to the airbag device of the present invention, the detector means preferably detects the displacement of the airbag device or the adjacent vehicle-body component caused when a load is applied to the airbag in the process of inflation.

Furthermore, according to the airbag device of the present invention, the vehicle-body component adjacent to the airbag device may comprise one of an instrument panel, a vehicle-body member, a steering member, a bracket, and a bolt.

According to the airbag device of the present invention, when the airbag starts to inflate in a state where a vehicle occupant or a child seat, for example, is positioned adjacent to the airbag device, the airbag comes into contact with the vehicle occupant or the child seat just after the start of the inflation. Thus, a load is applied to the airbag from the vehicle occupant or the child seat.

In the present invention, such a load is detected by a detector means in order to control the inflation of the airbag.

A strain gauge is suitable for the detector means due to being cheap and having a simple structure. Alternatively, the detector means may be a displacement sensor which can detect the displacement of the airbag device or the adjacent vehicle-body component (which may be, for example, an instrument panel, a vehicle-body member, a steering member, a bracket, or a bolt).

The present invention is suitable for passenger-seat and driver-seat airbag devices, but may also be used as, for example, a back-seat airbag device or a side airbag device.

DETAILED DESCRIPTION OF THE PREFERRED EMBODIMENTS

Figure 1:
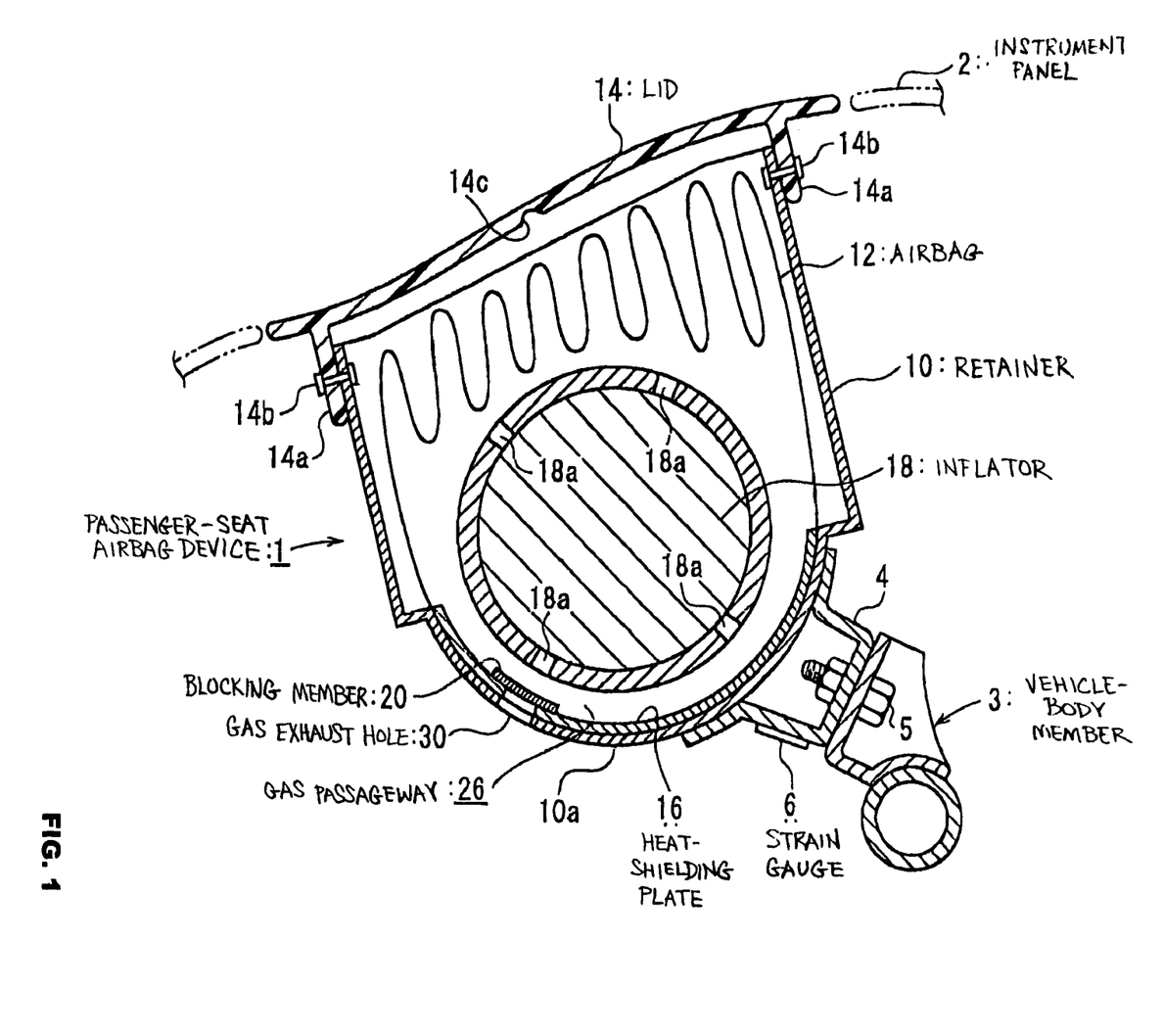
FIG. 1 is a cross-sectional view of a passenger-seat airbag device according to a first embodiment.
Figure 2:
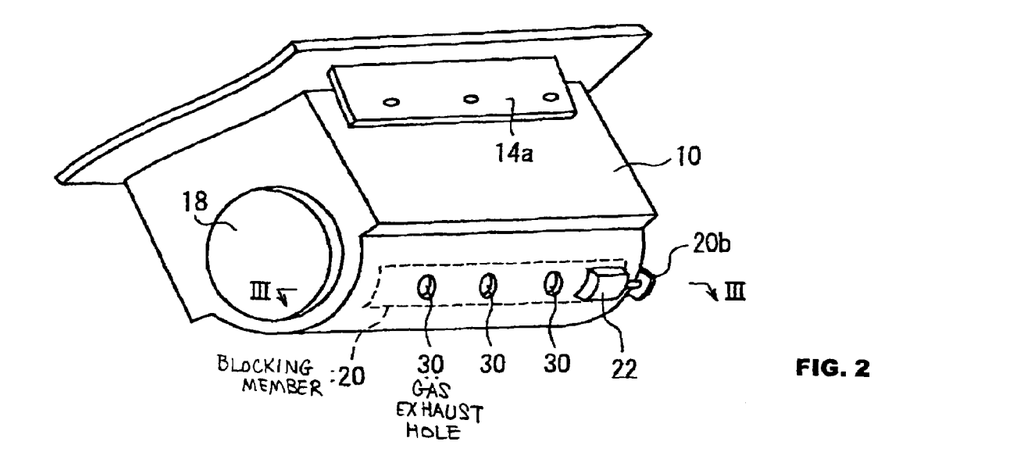
FIG. 2 is a perspective diagram viewed from the back of the airbag device in FIG. 1.
Figure 3:
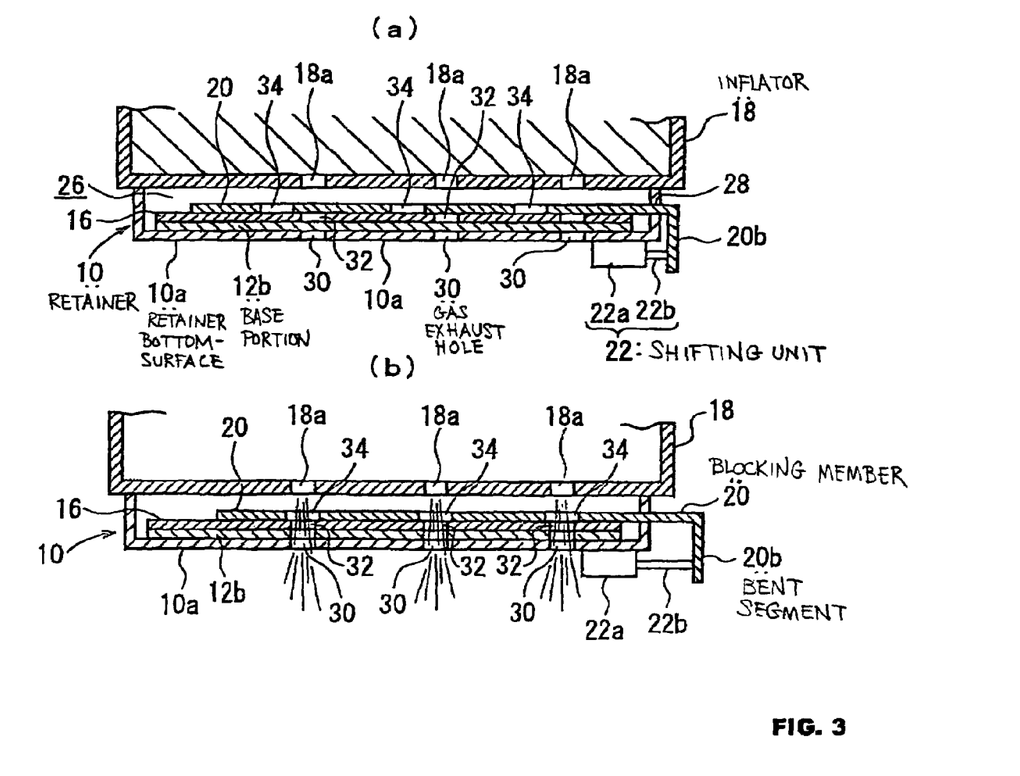
FIG. 3 includes a cross-sectional view (a) taken along line III-III in FIG. 2, and a diagram (b) illustrating the same cross-section as (a), but illustrating a state in which gas is released through exhaust holes.

Embodiments will now be described with reference to the drawings. FIG. 1 is a cross-sectional view of an airbag device according to a first embodiment of the present invention. FIG. 2 is a perspective diagram viewed from the back of the airbag device. FIG. 3(a) is a cross-sectional view taken along line III-III in FIG. 2. FIG. 3(b) illustrates the same cross-sectional view as FIG. 3(a), but illustrates a state in which gas is released through exhaust holes.

According to the first embodiment, an airbag device 1 is for a passenger seat and is set in an instrument panel 2. The airbag device 1 includes a bracket 4 which is fixed to a vehicle-body member (reinforcing member) 3 with, for example, a bolt 5. Moreover, a strain gauge 6 is attached to the bracket 4.

In the first embodiment, when a gas generator is activated, the passenger-seat airbag device 1 releases some of the generated gas out of a retainer via gas exhaust holes depending on the vehicle occupant's position, such that the deployment force of an airbag can be controlled. The structure of the airbag device 1 will be described below in detail.

The passenger-seat airbag device 1 includes a retainer 10 functioning as a casing; an airbag 12 folded inside the retainer 10; a lid 14 for covering an opening at the front side of the retainer 10; a heat-shielding plate 16 disposed in the airbag 12; a cylindrical inflator 18 functioning as the gas generator for generating gas for inflating the airbag 12; a blocking member 20 for closing off gas exhaust holes 30; and a shifting unit 22 for shifting the blocking member 20. The bracket 4 is fixed to the retainer 10 by, for example, welding.

The lid 14 has leg portions 14a which are fastened to the retainer 10 via fasteners 14b, such as rivets. The lid 14 is provided with a tearing line 14c.

The upper side of the retainer 10 as shown in FIG. 1 has an opening, which is covered with the lid 14. The lid 14 is flush with the instrument panel 2 surrounding the lid 14.

Referring to FIG. 3, the airbag 12 has a base portion 12b, which is disposed between the heat-shielding plate 16 and a retainer bottom-surface 10a. Thus, the airbag 12 is combined with the retainer 10. The heat-shielding plate 16 is fixed to the retainer 10 with, for example, rivets (which are not shown in the drawings).

Furthermore, the outer periphery surface of the inflator 18 and the heat-shielding plate 16 form a space (gas passageway) 26 therebetween.

One of the side surfaces of the retainer 10 is provided with a slit opening 28 (FIG. 3) through which the blocking member 20 extends. The blocking member 20 is inserted into the retainer 10 through the slit opening 28 and is disposed on the heat-shielding plate 16. One end of the blocking member 20 in the longitudinal direction is bent into an L-shape so as to form a bent segment 20b.

The retainer bottom-surface 10a is provided with a plurality of the gas exhaust holes 30 at positions where each hole 30 overlaps the blocking member 20. The gas exhaust holes 30 are disposed at a predetermined interval in the longitudinal direction of the blocking member 20. The base portion 12b of the airbag 12 covers the gas exhaust holes 30.

The heat-shielding plate 16 is provided with gas outflow holes 32 each corresponding to one of the gas exhaust holes 30.

Similarly, the blocking member 20 is provided with gas outflow holes 34 at the same interval as the gas exhaust holes 30 in the longitudinal direction of the blocking member 20. In the normal state (that is, when the airbag 12 is not inflated), the holes 34 are positioned such that they do not overlap the gas exhaust holes 30.

The shifting unit 22 is attached to the outer side of the retainer bottom-surface 10a of the retainer 10. In the first embodiment, the shifting unit 22 includes a cylinder 22a and a rod 22b protruding outward from the cylinder 22a. The protruding end of the rod 22b is fixed to the bent segment 20b of the blocking member 20. The cylinder 22a contains a piston and an explosive. When the explosive is ignited with an igniter (which is not shown in the drawings), a pressure is applied to the piston such that the rod 22b is driven outward in the protruding direction. The present invention is not limited to such an explosive-actuator mechanism, and alternatively, other linear-actuator mechanisms, such as a solenoid mechanism, may be used.

A detection signal from the strain gauge 6 is input to a controller device (which is not shown in the drawings) for the inflator 18 and the shifting unit 22 via a wire harness (which is not shown in the drawings). A detection signal from a vehicle-collision sensor (which is not shown in the drawings) is also input to the controller device.

In such an airbag device 1, if the vehicle collides with an object at a predetermined speed or higher and the vehicle occupant is not in contact with the lid 14, the inflator 18 is activated and the gas is released through gas emission holes 18a. The gas pressure allows the airbag 12 to start inflating and thus forces the lid 14 to be ripped along the tearing line 14c. As a result, the airbag 12 becomes inflated widely inside the vehicle cabin.

In this case, since the occupant is not in contact with the lid 14, the shifting unit 22 is not activated, and the entire volume of gas emitted through the gas emission holes 18a enters the airbag 12. This allows for quick inflation of the airbag 12 and high inner pressure in the airbag 12. Since the gas exhaust holes 30 are closed off by the blocking member 20 and are covered by the base portion 12b of the airbag 12, the base portion 12b in this case functions as a gasket so as to prevent gas leakage through the gas exhaust holes 30. The entire volume of gas emitted through the gas emission holes 18a at the bottom side of the inflator 18 is introduced into the airbag 12 via the gas passageway 26. This inflates the airbag 12 into its fully-deployed shape so as to restrain the vehicle occupant.

The detected stress by the strain gauge 6 changes in the following manner. After the inflator 18 starts its operation, a compressive stress increases gradually until the lid 14 is ripped and opened. Once the lid 14 is ripped open and the airbag 12 starts to become deployed in the vehicle cabin, the strain gauge 6 starts detecting tensile stress since the airbag 12 pulls the retainer 10 towards the interior of the vehicle cabin. This state continues until the airbag 12 is fully deployed. Subsequently, when the vehicle occupant crashes into the airbag 12, the strain gauge 6 starts detecting compressive stress again.

On the other hand, the detected stress by the strain gauge 6 changes differently if a vehicle occupant or a child seat is positioned adjacent to the airbag device 1, and if the lid 14 being pushed and opened by the airbag 12 or the airbag 12 being deployed towards the vehicle cabin comes into contact with the vehicle occupant or the child seat. For example, when the airbag 12 being deployed towards the vehicle cabin and pushing open the lid 14 comes into contact with a vehicle occupant or a child seat, the strain gauge 6 detects a compressive stress before the airbag 12 reaches a fully-deployed state. Furthermore, if the lid 14 being pushed open comes into contact with a vehicle occupant or a child seat, the compressive stress detected by the strain gauge 6 reaches a maximum value.

In such a case where the detected value of the strain gauge 6 diverges from the normal value, the shifting unit 22 is activated to drive the rod 22b in the protruding direction so as to reduce the amount of gas that is introduced into the airbag 12.

Accordingly, as shown in FIG. 3(b), the blocking member 20 is shifted such that the gas outflow holes 34, the gas outflow holes 32, and the gas exhaust holes 30 are aligned with one another. As a result, the gas emitted through the gas emission holes 18a reaches the base portion 12b of the airbag 12 via the holes 34 and 32. The temperature and pressure of the emitted gas cause the base portion 12b to be blown out so that the gas emitted through the gas emission holes 18a at the bottom side of the inflator 18 is discharged from the gas exhaust holes 30. Consequently, this reduces the amount of gas introduced into the airbag 12 so that the airbag 12 is inflated at a relatively slower rate and the inner pressure in the airbag 12 is reduced to a relatively lesser value.

Alternatively, in the first embodiment, when it is determined that the lid 14 is leaned against by a vehicle occupant based on the detected stress by the strain gauge 6, the inflator 18 may be prevented from operating even if the vehicle is involved in a collision.

Furthermore, in the first embodiment, although the deployment force of the airbag 12 is reduced by discharging gas outward through the gas exhaust holes 30, such a reduction of the deployment force may alternatively be performed by providing a plurality of inflators and activating only a certain number of the inflators for inflating the airbag 12. Specifically, in the process of inflating the airbag 12, if it is determined that the airbag 12 or the lid 14 becomes in contact with a vehicle occupant or a child seat based on the detected stress by the strain gauge 6, the deployment force of the airbag 12 may be reduced by preventing the other inflators from operating. As a further alternative, an output-adjustable multilevel inflator may be used such that the deployment force of the airbag 12 may be reduced by decreasing the output amount from the inflator.

In the first embodiment, although the strain gauge 6 is attached to the bracket 4, the strain gauge 6 may alternatively be disposed in the attachment section between the retainer 10 and the airbag 12.

Figure 6:
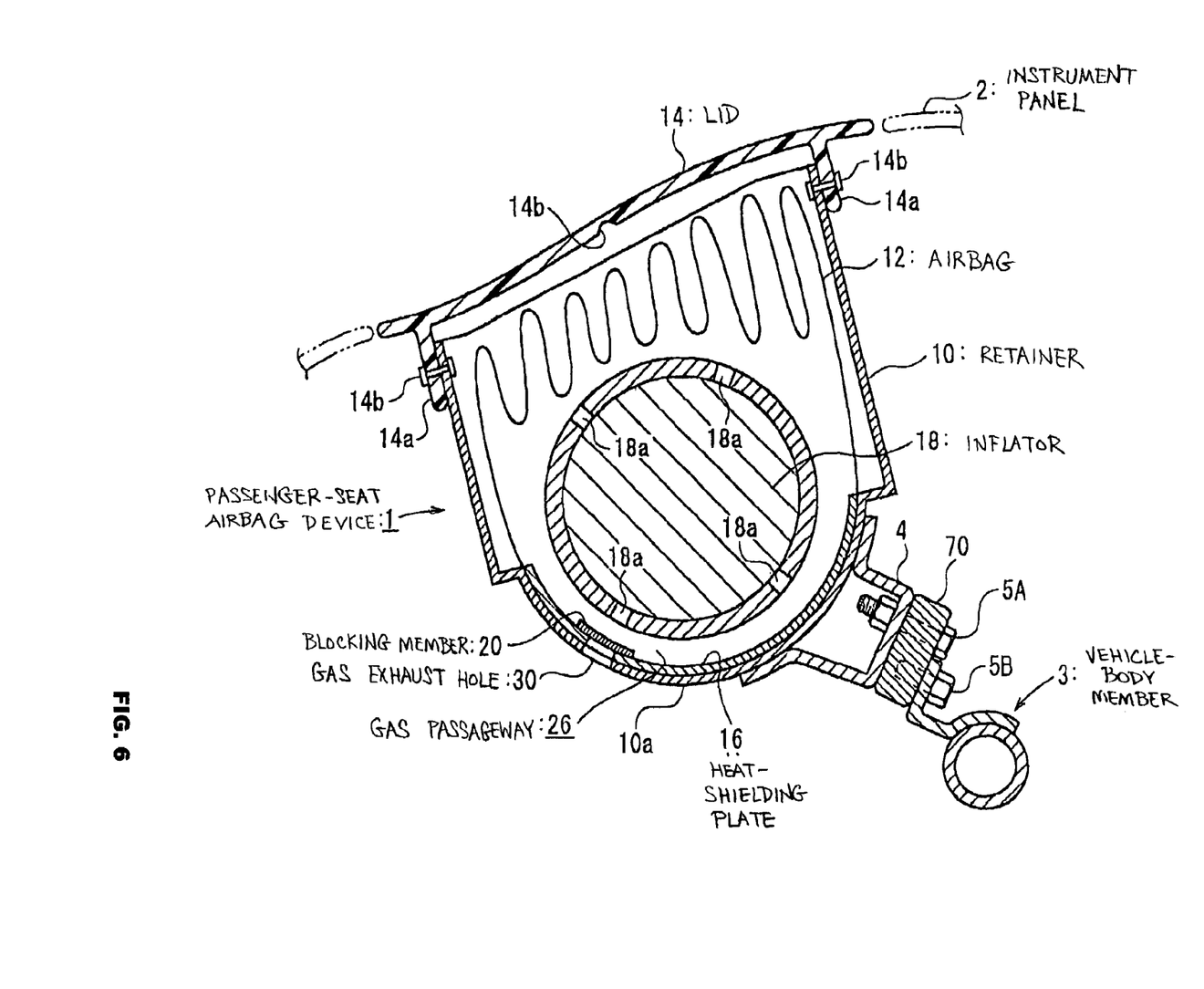
FIG. 6 is a cross-sectional view of a passenger-seat airbag device according to an alternative embodiment.

In the present invention, referring to FIG. 6, a strain sensor or a displacement sensor 70 may alternatively be disposed between the bracket 4 and the vehicle-body member 3. In this case, the leaning of a vehicle occupant against the lid or the instrument panel, for example, may be detected based on the output from the displacement sensor 70. In FIG. 6, the displacement sensor 70 is fixed to the bracket 4 with a bolt 5A, and is attached to the vehicle-body member 3 with a bolt 5B.

Figure 4:
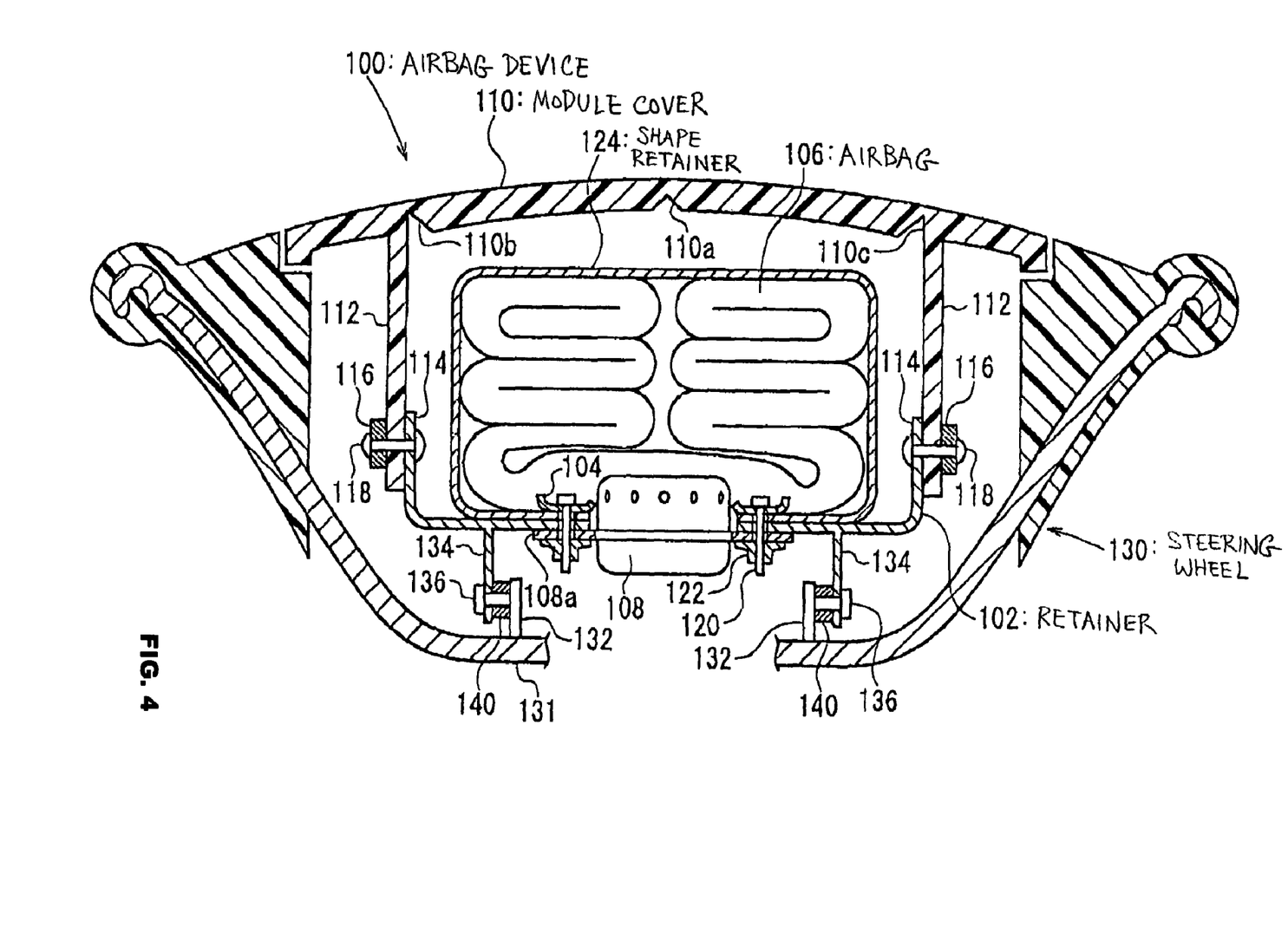
FIG. 4 is a cross-sectional view of a driver-seat airbag device according to a second embodiment.
Figure 5:
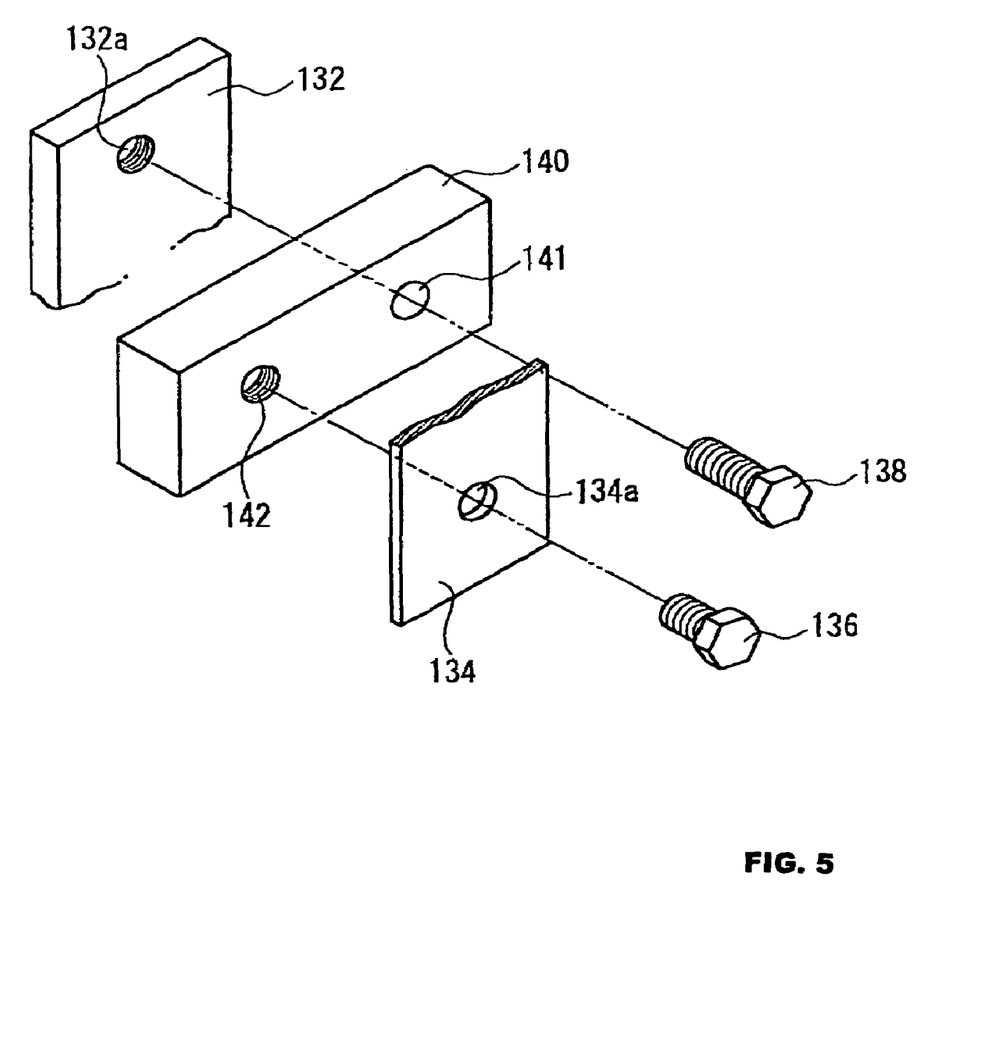
FIG. 5 is an exploded perspective view illustrating a part of the structure in FIG. 4.

FIG. 4 is a cross-sectional view of a driver-seat airbag device 100 according to a second embodiment of the present invention. FIG. 5 is an exploded perspective view illustrating the connecting portion between a retainer and a steering member.

The driver-seat airbag device 100 includes, for example, a retainer 102; an airbag 106 mounted to the retainer 102 via an airbag-attachment ring 104; an inflator 108 for inflating the airbag 106; and a module cover 110 which covers the folded airbag 106. The module cover 110 is provided with a tearing line 110*a* and a pair of hinge grooves 110*b* and 110*c*.

The module cover 110 has a pair of sidewalls 112 protruding from its undersurface. On the other hand, the retainer 102 also has a pair of sidewalls 114, which is bent forward from the retainer 102. Each sidewall 114 is fixed to the corresponding sidewall 112 with a rivet 118 via a washer 116.

The inflator 108 has a flange 108*a*. Bolts 120, which protrude from the airbag-attachment ring 104, extend through the retainer 102 and the flange 108*a* and are tightly coupled with corresponding nuts 122 so as to fix the inflator 108 and the airbag 106 to the retainer 102. The inflator 108 is a multilevel inflator, in which one portion generates gas and the other portion subsequently generates gas.

The folded shape of the airbag 106 is maintained by a shape retainer 124. There are cases where this shape retainer 124 is not provided.

A base (steering base) 131 of a steering wheel 130 is provided with brackets 132 which are projected upward from the base 131. On the other hand, the retainer 102 has leg segments 134 projected downward from its undersurface. Each of the leg segments 134 has load detecting means 140, such as a strain gauge or a displacement sensor, attached thereto with a corresponding bolt 136. Such detecting means 140 is fixed to the corresponding bracket 132 on the steering wheel 130 with a corresponding bolt 138.

As shown in FIG. 5, in the second embodiment, each detecting means 140 has a through-hole 141 and a screw-hole 142. On the other hand, each leg segment 134 has a through-hole 134*a*, and each bracket 132 has a screw-hole 132*a*. Each bolt 136 extends through the corresponding through-hole 134*a* and is screwed into the corresponding screw-hole 142. On the other hand, each bolt 138 extends through the corresponding through-hole 141 and is screwed into the corresponding screw-hole 132*a*. Alternatively, nuts may be provided in place of the screw-holes 132*a* and 142, and in that case, the screw-holes 132*a* and 142 may act as through-holes.

According to the driver-seat airbag device 100, if there is a sufficient space between a vehicle occupant and the airbag device 100, the airbag device 100 performs the normal operation when the vehicle is involved in a collision. In other words, one portion of the inflator 108 discharges gas in order to inflate the airbag 106, and the inflating airbag 106 rips and opens the module cover 110 so as to become deployed. Subsequently, the other portion of the inflator 108 discharges gas until the airbag 106 is inflated to its fully-deployed shape.

During the inflation of the airbag 106, the detecting means 140 detects a load in the downward direction in FIG. 4 until the module cover 110 is ripped and opened. After the module cover 110 is ripped open, the detecting means 140 detects an upward load since the retainer 102 is pulled by the airbag 106 being deployed. Once the airbag 106 is fully deployed and retrains the vehicle occupant, the detecting means 140 starts detecting the downward load again.

In contrast, if a vehicle occupant is adjacent to the airbag device 100, one portion of the inflator 108 is activated in order to inflate the airbag 106, but since the airbag 106 comes into contact with the vehicle occupant during the inflation process, the detecting means 140 starts detecting a downward load earlier than usual. In such a case, the other portion of the inflator 108 is controlled such that it is prevented from discharging gas.

In the second embodiment, if the steering wheel 130 is leaned against by a vehicle occupant prior to the operation of the inflator 108, a downward load due to the leaning force is detected by the detecting means 140. Accordingly, it is preferable that a control circuit (which is not shown in the drawings) for the inflator 108 prevents the inflator 108 from operating.

Alternatively, like the airbag device shown in FIGS. 1 to 3, the driver-seat airbag device 100 may be provided with a gas-exhaust mechanism including gas exhaust holes, a blocking member, and a shifting unit for the blocking member. In that case, if a vehicle occupant is adjacent to the airbag device, the gas may be released through the gas exhaust holes during the operation of the inflator.

The technical scope of the present invention is not limited to the above embodiments, and modifications are permissible within the scope of the present invention. The present invention may be used in combination with determination means, such as a seat sensor or an image-capturing device, for determining the position of the vehicle occupant.

What is claimed is:

1. An airbag device for a vehicle, the airbag device comprising:
   an airbag for being deployed during emergency conditions;
   a retainer assembly for mounting the airbag to a predetermined component of the vehicle;
   a gas generator that inflates an interior space of the airbag with inflation gas for deployment thereof;
   a detector for detecting varying loads applied to the retainer assembly or the predetermined vehicle component based on different states of the airbag during deployment thereof, the detector being constructed and arranged to detect a lean force transmitted to the retainer assembly or the predetermined vehicle component generated by an object prior to airbag deployment; and
   an inflation gas control mechanism that is operable to control the amount of inflation gas in the airbag internal space based on the deployed airbag state and to prevent the gas generator from supplying the airbag interior space with inflation gas upon detection by the detector of the lean force transmitted to the retainer assembly or the predetermined vehicle component.

2. The airbag device claim 1, wherein the detector is operable to detect compressive and tensile stresses generated in the retainer assembly or the predetermined vehicle component depending on the airbag deployment states.

3. An airbag device for a vehicle, the airbag device comprising:
   an airbag for being deployed during emergency conditions;
   a retainer assembly for mounting the airbag to a predetermined component of the vehicle;

a gas generator that inflates an interior space of the airbag with inflation gas for deployment thereof; and a detector for detecting varying loads applied to the retainer assembly or the predetermined vehicle component based on different states of the airbag during deployment thereof, wherein the detector comprises one of a strain gauge and a displacement sensor.

4. The airbag device of claim 1, where the retainer assembly includes at least one rigid member to which the detector is mounted for detecting stresses in the rigid member or relative movement of the rigid member.

5. The airbag device of claim 1, wherein the detector is mounted between the retainer assembly and the predetermined vehicle component.

6. The airbag device of claim 1, wherein the inflation gas control mechanism includes a gas discharge mechanism of the retainer assembly that is operable to reduce inflation rate of the airbag.

7. The airbag device of claim 1, wherein the inflation gas control mechanism comprises the gas generator with the gas generator having different levels of inflation gas output or comprises multiple gas generators to allow inflation gas output into the airbag interior space to be regulated based on the loads detected by the detector.

8. The airbag device of claim 1, wherein the detector is mounted to the retainer assembly, the predetermined vehicle component, or both, and is disposed entirely outside the airbag interior space.

9. An airbag device for a vehicle, the airbag device comprising:
   an airbag for being deployed during emergency conditions;
   a retainer assembly having an interior space for securing the airbag therein in a compact, configuration to a predetermined component of the vehicle;
   an interior space of the airbag for being inflated during airbag deployment;
   a gas generator that inflates the airbag interior space with inflation gas so that the airbag expands from the compact configuration for deployment thereof; and
   a detector mounted at a predetermined position that is spaced from both the retainer assembly interior space and the airbag interior space for detecting loads generated by the airbag deployment on at least one of the retainer assembly and the predetermined vehicle component.

10. The airbag device of claim 9, wherein the detector is mounted to one of the retainer assembly and the predetermined vehicle component.

11. The airbag device of claim 9, wherein the detector is mounted between the retainer assembly and the predetermined vehicle component.

12. The airbag device of claim 9, wherein the detector is constructed and arranged to detect a lean force transmitted to the predetermined vehicle component generated by a passenger prior to airbag deployment.

13. The airbag device of claim 9, wherein the detector is operable to detect compressive and tensile stress loads generated in the at least one of the retainer assembly and the predetermined vehicle component during airbag deployment.

14. An airbag device for a vehicle, the airbag device comprising:
   an airbag for being deployed during emergency conditions;
   a retainer assembly for securing the airbag in a compact, configuration to a predetermined component of the vehicle;
   an interior space of the airbag for being inflated during airbag deployment;
   a gas generator that inflates the airbag interior space with inflation gas so that the airbag expands from the compact configuration for deployment thereof; and
   a detector mounted at a predetermined position that is spaced from the airbag interior space for detecting loads generated by the airbag deployment on at least one of the retainer assembly and the predetermined vehicle component, wherein the detector comprises one of a strain gauge and a displacement sensor.

15. The airbag device of claim 9, where the predetermined vehicle component comprises one of an instrument panel, a vehicle body member, a steering member, a bracket and a bolt.

* * * * *

UNITED STATES PATENT AND TRADEMARK OFFICE
CERTIFICATE OF CORRECTION

PATENT NO. : 7,393,007 B2 Page 1 of 1
APPLICATION NO. : 11/022403
DATED : July 1, 2008
INVENTOR(S) : Masayoshi Kumagai It is certified that error appears in the above-identified patent and that said Letters Patent is hereby corrected as shown below:

Column 6, line 59, after "device" insert --of--.

Signed and Sealed this

Thirtieth Day of September, 2008

JON W. DUDAS
*Director of the United States Patent and Trademark Office*